US008860896B2

(12) United States Patent
Kroll et al.

(10) Patent No.: US 8,860,896 B2
(45) Date of Patent: Oct. 14, 2014

(54) PHASE MODULATOR FOR MODULATING LIGHT INTERACTING WITH THE PHASE MODULATOR

(75) Inventors: Bo Kroll, London (GB); Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 140 days.

(21) Appl. No.: 13/513,235

(22) PCT Filed: Dec. 1, 2010

(86) PCT No.: PCT/EP2010/068582
§ 371 (c)(1),
(2), (4) Date: Jun. 1, 2012

(87) PCT Pub. No.: WO2011/067265
PCT Pub. Date: Jun. 9, 2011

(65) Prior Publication Data
US 2012/0236219 A1   Sep. 20, 2012

(30) Foreign Application Priority Data

Dec. 1, 2009  (DE) .......................... 10 2009 047 371

(51) Int. Cl.
| G02F 1/1335 | (2006.01) |
| G02F 1/1343 | (2006.01) |
| G02F 1/139 | (2006.01) |
| G02F 1/29 | (2006.01) |

(52) U.S. Cl.
CPC ........ *G02F 1/1393* (2013.01); *G02F 1/134363* (2013.01); *G02F 1/292* (2013.01)
USPC ................................ 349/15; 349/96; 349/141

(58) Field of Classification Search
CPC ................... G02F 1/133528; G02F 1/133536; G02F 1/134363; G02F 1/136213; G02B 27/2214; G02B 27/26; G02B 5/3033; H04N 13/0404
USPC ............................................. 349/15, 96, 141
See application file for complete search history.

(56) References Cited

U.S. PATENT DOCUMENTS

| 5,638,201 A | 6/1997 | Bos et al. |
| 2005/0179855 A1 | 8/2005 | Helgee et al. |

(Continued)

FOREIGN PATENT DOCUMENTS

| DE | 10 2009 045 125 | 9/2009 |
| DE | 10 2009 002 987 A1 | 11/2009 |

(Continued)

OTHER PUBLICATIONS

International Search Report, dated Feb. 8, 2011, issued in priority International Application No. PCT/EP2010/068582.

(Continued)

*Primary Examiner* — Mike Qi
(74) *Attorney, Agent, or Firm* — Saul Ewing LLP

(57) ABSTRACT

A phase modulator for the modulation of the phase of circular polarised light which interacts with the phase modulator. The phase modulator has a first and a second substrate, an electrode arrangement and a liquid crystal layer with liquid crystal molecules. The first substrate is disposed adjacent to the second substrate. The liquid crystal layer is disposed between the two substrates. The first substrate has a first surface, and the second substrate has a second surface. The liquid crystal molecules situated next to the first surface are oriented substantially parallel to the first surface. The liquid crystal molecules situated next to the second surface are oriented substantially perpendicular to the second surface. An in-plane component of the liquid crystal molecule orientation can be set within an angular range of about 180°, e.g. between 90° and +90° related to a specifiable central orientation.

10 Claims, 12 Drawing Sheets

(56) References Cited

U.S. PATENT DOCUMENTS

2009/0284671 A1  11/2009  Leister
2012/0206667 A1* 8/2012  Kroll et al. .................. 349/15

FOREIGN PATENT DOCUMENTS

| DE | 10 2009 028 626 A1 | 1/2011 |
|---|---|---|
| WO | 00/03288 | 1/2000 |
| WO | 2006/066919 A1 | 6/2006 |
| WO | 2008/104533 A1 | 9/2008 |
| WO | WO 2008/104533 A1 * | 9/2008 ............ G02F 1/1337 |
| WO | 2010/149587 A2 | 12/2010 |
| WO | 2011/039286 A1 | 4/2011 |

OTHER PUBLICATIONS

International Preliminary Report on Patentability, dated Apr. 3, 2012 and Written Opinion, issued in priority International Application No. PCT/EP2010/068582.

Pancharatnam S., "Achromatic Combinations of Birefringent Plates," Proc. Ind. Acad. Sci., pp. 137-144 (1955).

* cited by examiner

HAN direction of turn of the optical axis in
dependence of the sign of the voltage (Prior Art)

IPS like electrode arrangement for amplitude modulating pixel with HAN (Prior Art) (not suitable for phase modulating pixel)

fixed voltage gradient for a pixel or individual
control of the electrodes for deflection gratings LC Polarisation Grating (Prior Art)

Deflection grating with the same grating pitch
Changing of the direction of rotation and changing of the incident polarization at the same time

PHASE MODULATOR FOR MODULATING LIGHT INTERACTING WITH THE PHASE MODULATOR

CROSS REFERENCE TO RELATED APPLICATIONS

This application claims the priority of PCT/EP2010/068582, filed on Dec. 1, 2010, which claims priority to German Application No. 10 2009 047371.8, filed Dec. 1, 2009, the entire contents of all of which are hereby incorporated in total by reference.

BACKGROUND OF THE INVENTION

The present invention relates to a phase modulator for the modulation of the phase of circular polarised light which interacts with the phase modulator. The present invention further relates to a display for the presentation of two-dimensional and/or three-dimensional image contents.

According to S. Pancharatnam, Proc. Ind. Acad. Sci., p. 137, 1955, the phase of light can be modulated in that circular polarised light is used and that a λ/2 plate is rotated in its plane. This is shown schematically in FIG. 1. Circular polarised light falls on a λ/2 plate. The direction of rotation of the circular polarised light changes. In addition, a phase occurs which depends on the angle of the optical axis of the λ/2 plate in the plane. If the λ/2 plate is turned by the angle φ (lower part of FIG. 1), then the phase at the exit will change by the angle 2φ. The phase change is thus twice the rotation angle of the λ/2 plate. Consequently, a phase modulation or phase change of 360 degrees (2π) is achieved by turning the λ/2 plate by 180 degrees.

Instead of mechanically rotating a λ/2 plate, it is possible that in a light modulator which is based on liquid crystals (LCs) the long axis of the LC molecules is turned, for example as induced by the application of an electric field.

However, when doing so, nematic LCs typically only react on the absolute value and not on the sign of the applied voltage. The LC molecules can rotate between 0 and maximum 90 degrees only given a certain surface orientation of the LC molecules and an electric field in the pixel plane—as in an in-plane switching liquid crystal mode (IPS LC mode)—where the electric field is applied at an angle relative to the surface orientation and where this angle can be up to 90 degrees. Smectic LCs, such as used in for example in a polarisation-shielded smectic liquid crystal mode (PSS LC mode), will change their direction of rotation as the sign of the field changes. However, +90-degree rotation or −90-degree rotation of the LCs as such is not possible. In contrast to nematic LCs, smectic LC molecules are arranged in layers, and a 90-degree rotation of the individual molecules would not be possible while maintaining this layered structure. The desired angular range of LC molecule rotation of 180 degrees is thus not achievable using a conventional LC mode.

Document DE 10 2009 045 125.0 and the international patent application PCT/EP2010/064504 describe a solution for this problem, where the angular range of LC molecule rotation is enlarged by combining a switchable surface alignment with one of said LC modes. The disadvantage of that solution is that it requires more elaborate and costly manufacturing and control processes. This is because a special alignment layer, which involves other than the standard materials used in display panel production today, must be applied to a substrate when manufacturing a spatial light modulator (SLM). When addressing the SLM, it may be necessary to generate separate signals for switching the surface orientation and for direct control of the LC molecules. This may further require faster signal transmission when addressing the pixels of an SLM if the two signals are needed one after another in order to set an individual phase value by the combination of the two signals.

WO 2008/104533 A1 and publications of similar content, such as conference documents of Eurodisplay 2009 [1] and Imid 2009 [2], describe a hybrid aligned nematic LC mode (HAN). The LC molecules which are sandwiched between two substrates align perpendicular to one substrate surface, but parallel to the other substrate surface. This surface orientation is fix. Parallel orientation is typical for example in IPS or twisted nematic (TN) mode arrangements, whereas perpendicular orientation is typical in vertical alignment (VA) mode arrangements. The two substrates require different alignment layers, but both types can be made with standard procedures which are known in the LCD industry.

In the most simple theoretical model, the LC molecules are commonly referred to as 'rigid rods'. Deviating from this simple assumption, LC molecules can for example also have a curved, 'banana-shaped' form or a clubbed, 'pear-shaped' form. While in two ideal rods a parallel and anti-parallel orientation are energetically equal, in the alternative shapes, in particular in the case of an induced deformation as in splayed or bent shapes, however, parallel orientations of the pear- or banana-shaped molecules are preferred relatively to anti-parallel orientations.

A deformation of the LC thus induces a polarisation in an LC material with a corresponding molecule shape. This is known as the 'flexo-electric effect'. If there is a flexo-electric polarisation, then the LC molecules react specifically to the sign of an applied electric field.

In the HAN arrangement, such a deformation is induced caused by the different surface orientations of the LCs at the two substrate surfaces and by the elastic forces among the individual LCs (due to a continuous transition from parallel to perpendicular orientation across the thickness of the LC layer), so that a flexo-electric polarisation is generated.

If an in-plane field is applied, then the LC molecules, or their projection into the display plane (which is parallel to the surface of the SLM substrate), will rotate. Due to the flexo-electric polarisation, the direction of rotation of the molecules then depends on the sign of the voltage. Document WO 2008/104533 A1 describes arrangements where the electrodes are arranged as in an IPS display and arrangements where an additional base electrode is disposed on the same substrate, as in a fringe-field switching (FFS) display. Document WO 2008/104533 A1 further describes arrangements where in-plane electrodes or FFS electrodes are optionally disposed on the substrate with parallel orientation of the LC molecules or on the substrate with vertical orientation of the LC molecules. The former is described there as the embodiment for LC materials with positive Δε, the latter as the embodiment for LC materials with negative Δε.

According to document WO 2008/104533 A1, the purpose of these arrangements is to realise short response times for the two switching processes (switching on and switching off), because both of them are controlled by one field in that different signs of the voltage may be used. For amplitude modulation, linear polarised light is used, and the required LC molecule rotation angles only range from −45 degrees to +45 degrees.

In the electrode arrangement described in document WO 2008/104533 A1 and related publication [1], the same voltage is supplied to every other electrode, similar to an IPS arrangement. This means that positive and negative fields between two electrodes occur in alternate arrangement. Consequently, the direction of rotation of the LC molecules also alternates in small regions within a pixel. This does not matter in an amplitude modulator, because the amplitude modulation depends on the absolute value but not on the sign of the rotation angle. For phase modulation, however, this arrangement would not be suitable because different phase values would be realised in different regions within one pixel. The same applies to an FFS-style electrode arrangement. One direction of rotation would be realised in one half of the spaces between two electrodes of the grid, whereas a different direction of rotation of the LC molecules would be realised in every other space, as illustrated in FIG. 3 in publication [2]. Such an arrangement would again be suitable for amplitude modulation, but not for phase modulation.

SUMMARY OF THE INVENTION

It is thus the object of the present invention to provide an LC-based light modulator or phase modulator which serves to modulate the phase of the light through a range of phase values of about $2\pi$ and whose working principle is based on the rotation of the in-plane component of the LC molecules. It would be desirable to find an arrangement which is less elaborate and costly regarding manufacturing and control than the combination of LC modes, e.g. IPS or PSS, with a switchable surface alignment, as described in document DE 10 2009 045 125.0.

The object defined above is solved by a phase modulator for the modulation of the phase of circular polarised light which interacts with the phase modulator according to claim 1. The phase modulator comprises a first and a second substrate, an electrode arrangement and a liquid crystal layer with liquid crystal molecules. The first substrate is disposed in opposition to the second substrate. The first substrate is preferably disposed substantially parallel to the second substrate. The liquid crystal layer is disposed between the two substrates. The first substrate has a first surface or surface layer, and the second substrate has a second surface or surface layer. The first surface is made such to align the liquid crystal molecules which are situated next to the first surface in an orientation which is substantially parallel to the first surface. The second surface is made such to align the liquid crystal molecules which are situated next to the second surface in an orientation which is substantially perpendicular to the second surface. The electrode arrangement is controlled such that an in-plane component of the liquid crystal molecule orientation can be set within an angular range of about 180 degrees, e.g. between −90 degrees and +90 degrees related to a specifiable central orientation.

A phase modulator or light modulator according to this invention follows in particular the working principle of a spatial light modulator (SLM), i.e. where the phase of the light which interacts with the phase modulator can be affected or modulated specifically dependent on the actual spatial position of the phase modulator, in particular depending on the actual control state of the phase modulator. The phase modulator according to this invention is provided for interaction with circular polarised light. If the light of a light source does not exhibit circular polarisation, a suitable polariser can be provided on the entry side of the phase modulator according to this invention.

According to this invention, a HAN arrangement is used in order to realise a rotation of the in-plane component of the LC molecule orientation optionally e.g. from 0 to +90 degrees or from 0 to −90 degrees depending on the sign of the electric field, so that altogether a phase modulation of between 0 and $2\pi$ is achieved by controlling the applied field accordingly. An in-plane component of the LC molecule orientation of −90 degrees corresponds to a phase modulation of 0, an in-plane component of the LC molecule orientation of 0 degrees corresponds to a phase modulation of $\pi$, and an in-plane component of the LC molecule orientation of +90 degrees corresponds to a phase modulation of $2\pi$. The thickness of the LC layer is preferably chosen such that its optical function is that of a $\lambda/2$ plate. A different thickness of the LC layer is permitted too and can also be used for phase modulation if a circular polariser is provided on the exit side of the phase modulator. However, the transmittance of the phase modulator is disadvantageously reduced due to the different thickness then. A phase modulator according to this invention can preferably be designed for more than one wavelength (e.g. for red, green and blue light) in that the thickness of the liquid crystal layer is chosen such that its optical function is that of a $\lambda/2$ plate for a medium wavelength (e.g. green). Generally, the thickness of the LC layer is chosen such that its optical function is that of a retardation plate.

In a phase-modulating SLM, a comb-shaped arrangement of typically multiple electrodes which are disposed across a pixel surface generates a uniform in-plane voltage gradient across the pixel. The sign of the voltage gradient determines the direction of rotation of the LC molecules and the steepness of the gradient determines the rotation angle of the liquid crystal molecules.

A similar arrangement of the phase modulator can also be employed in a reflective display, where a smaller angular range of between +45 degrees and −45 degrees may suffice to realise a phase modulation of $2\pi$, or a thinner liquid crystal layer whose optical function is preferably that of a $\lambda/4$ plate, and to be able to use the full angular range because the light passes through the reflective phase-modulating SLM twice. Insofar, the phase modulator according to this invention can be designed such that it can be operated both in transmissive or reflective environments.

The phase deflector according to this invention can be used in particular in a similar way as the phase deflector that is described in document DE 10 2009 045 125.0 and in the international patent application PCT/EP2010/064504. Therefore, the disclosed content of document DE 10 2009 045 125.0 and the international patent application PCT/EP2010/064504 shall be included here in full. Diffractive optical elements, such as for example phase deflectors, which can be used in holographic displays for observer tracking, are described for example in document DE 10 2009 028 626.8 and in the international patent application PCT/EP2010/058625, where they are called diffraction devices. Since the phase deflector according to this invention can be used for example in a similar way as the diffraction device described in documents DE 10 2009 028 626.8 and PCT/EP2010/058625, the disclosed content of document DE 10 2009 028 626.8 and the international patent application PCT/EP2010/058625 shall be included here in full.

A variable deflection grating which is based on the principle of phase modulation and which is used in a similar way as described in documents DE 10 2009 028 626.8 and PCT/EP2010/058625 and whose electrode pitch is about in the same order of magnitude as the thickness of the LC layer, can be realised by way of discretely controlling individual in-plane electrodes. A periodically rotating in-plane component of the LC orientation is preferably set here, as in a polarisation grating, so that a continuous rotation of the in-plane projection of the LC molecules between 0 and 180 degrees is realised within one grating period. This is achieved both by a respective voltage gradient between the electrodes and by elastic forces among the individual LC molecules. If controlled accordingly, it is possible to set variably adjustable orientations of the liquid crystal molecules and, in conjunction with that, variably adjustable refractive index distributions such that as a result variable grating periods can be set in an optical application. In other words, a variable polarisation grating is realised. This can be done in a simple way and is known from prior art documents. The realisation is for example simpler than in the variable polarisation grating which is known from document US 2009/0073331 A1, where it is referred to as V-COPA.

In contrast to the procedure described in document DE 10 2009 045 125.0, a conventional fix surface orientation of the LC molecules, which is made using methods which are common in the industry, can preferably be used in the context of the present invention, for example by way of brushing a substrate surface coating. The demands made on the manufacture and control of the phase modulator according to this invention are thus lower. In contrast to the PSS LC mode, nematic LCs can be used. It is generally easier to process the latter (filling, alignment). It is further possible to take advantage of the fast on/off switching as described in document WO 2008/104533 A1 for phase modulation. It is further possible to take advantage of the high diffraction efficiency that polarisation gratings have for deflection means.

Now, the phase modulator could be designed such that the light which interacts with the phase modulator is variably deflected in a specifiable direction due to diffraction and that the function of a deflection grating is thus achieved. Then, the phase modulator according to this invention would suit similar applications as for example described in document DE 10 2009 028 626.8. For this, if the electrodes of the electrode arrangement of the phase modulator are controlled accordingly, a specifiable orientation of the liquid crystal molecules could be set as a result of which a corresponding refractive index distribution would occur in the layer of liquid crystal molecules which in turn would realise the function of a deflection grating.

The electrodes of the electrode arrangement of the phase modulator could be controlled such that depending on the position of the phase modulator at which the light beam hits the phase modulator the light or this light beam is deflected in a variably specifiable direction.

As an alternative, the phase modulator could comprise individual pixels. As such, it could for example serve as the optical component of a holographic display according to document WO 2006/066919 A1 to which hologram information is written in order for the holographic display to reconstruct and represent three-dimensional scenes. Each pixel of the phase modulator comprises at least two electrodes of the electrode arrangement.

The electrode arrangement could be controlled such that a substantially constant voltage gradient is realised in the region of a pixel, in particular in a phase modulator. The electrode arrangement could be controlled such that a substantially constant voltage difference is realised between two neighbouring electrodes, in particular in a phase deflector.

In a conventional IPS pixel of an IPS light modulator, where the LC orientation is only affected by the squared voltage, an electrode structure will typically be used which resembles two interleaving combs, see for example FIG. 3 for this. Only two voltage values are required, namely one voltage value for the electrode that corresponds with one such comb (common electrode), and one voltage value for the electrode that corresponds with the other comb. This means that voltages with different signs (+V and −V) are applied between two in-plane electrodes in alternate arrangement. In a pixel of a light modulator according to this invention, however, a voltage of same sign is always required between two neighbouring electrodes. This means that variably rising or—depending on the phase value—falling voltage values must be applied to the individual electrodes of the electrode arrangement within the pixel. The voltage values which are needed to control a pixel can thus be higher than in other LC modes, such as IPS.

In a preferred embodiment, the surface of a substrate therefore has a structured surface coating or alignment layer with first and second structured regions The first and second structured regions are arranged next to each other and between neighbouring electrodes and are designed such that the liquid crystals which are in contact with the first structured region are aligned substantially anti-parallel to the liquid crystals which are in contact with the second structured region. A hybrid alignment of liquid crystals could thus be provided with a structured alignment layer on a surface of at least one substrate. This is preferably the surface of the substrate where the liquid crystals are substantially oriented parallel to the surface. The structure—for example if an alignment layer is made of polyimide and rubbed mechanically—corresponds to anti-parallel rubbing directions in different regions of this polyimide alignment layer. However, the alignment can generally also be achieved using different materials and different manufacturing methods, e.g. by way of photo-alignment. In the case of photo-alignment, it would be possible to use masks for spatial structuring, so that regions which are covered by the mask differ in surface orientation from regions which are not covered by the mask. The structure is dimensioned such that the one orientation corresponds with the space between a pair of neighbouring electrodes on a substrate with in-plane electrodes and that substantially the opposite orientation corresponds with the space between the neighbouring pair of electrodes. Optionally, the structure could also be applied to the substrate which does not feature electrodes. However, the structured regions of the alignment layer must then be matched with the electrodes of the opposite substrate. In these cases the hybrid alignment of liquid crystals works such that the liquid crystals at one electrode pair will rotate clockwise if a positive voltage is applied. At the following electrode pair, the liquid crystals will rotate clockwise if a negative voltage is applied. Such a pixel can preferably be provided with interleaved comb-shaped in-plane electrodes and be controlled in the same way as in a conventional IPS LC display panel.

Document DE 10 2009 002 987 A1 describes a controllable device for phase modulation which is based on the PSS LC mode and where each LC modulator cell is addressed locally with positive or negative voltage values depending on the phase values which are actually to be written. Negative voltages are used for example to set phase values of between 0 and $\pi$, positive voltages to set phase values of between $\pi$ and $2\pi$. It must be noted here that it is common practice to use AC voltages in displays, namely such that a positive voltage is applied at a pixel during one frame or image and a negative voltage is applied during the next frame. This serves to circumvent chemical decomposition of the LC materials and charge carrier effects which would occur if a DC voltage was applied for a long time. With conventional LC modes which are only affected by squared applied voltages, the change of sign of the voltage does not have any effect on LC orientation. If a PSS mode is used in an amplitude modulator, however, there are two different LC orientations caused by the different signs, but both of them have the same transmittance. In contrast, changing the sign of the applied voltage in a PSS phase modulator would result in phase values which are modified in an undesired way. Document DE 10 2009 002 987 A1 proposes the solution of introducing a global offset of the phase between subsequent frames because only the relative phase between two adjacent pixels is relevant for the functionality of a phase modulator and not the absolute phase which is written to the pixel. As a result of this phase offset, the sign of the voltage changes between two frames for most pixels of the phase modulator. The above-mentioned DC voltage effects are thus circumvented.

HAN differs from PSS for example in that in-plane potential differences between two neighbouring in-plane electrodes on the same substrate serve for addressing HAN light modulators or HAN phase deflectors, while out-of-plane potential differences between electrodes on opposite substrates are used for addressing PSS-mode devices. PSS and HAN have in common that, when used in an amplitude display, if the sign of the applied in-plane voltage is changed then the resultant transmittance is the same although the LC orientation differs, and, when used in a phase display, changing the sign of the applied in-plane voltage results in different phase values.

This is why a certain phase distribution should also be written to a phase modulator which is run in the HAN mode—and in particular to a HAN light modulator or HAN phase deflector—where the application of a DC voltage should be avoided wherever possible. If a phase deflector is used for observer tracking in a holographic display which is designed as a multi-user system, there would be a balance of positive and negative voltages between two electrodes of the phase deflector already on statistical temporal average because of the change-over between different eye positions. However, in the particular case where in a single-observer system this observer stays in a fix position for a longish period of time (e.g. a few seconds) a constant grating period could for example require to be set during this period. This would bring about the risk of DC voltage effects again. In a SLM, the risk of DC voltage effects will be immanent if e.g. static image contents are shown.

In a preferred embodiment of the present invention, a phase offset of the written phase values is thus introduced between two subsequent frames in order to circumvent disturbing DC voltage effects. It must be noted that it is not necessarily the absolute value of the voltage applied to the in-plane electrodes that changes its sign, but that the voltage difference between neighbouring in-plane electrodes is changed. This is illustrated in FIG. 9 and explained in more detail in the accompanying description of the drawing.

In an alternative embodiment, it is proposed to circumvent DC voltage effects by performing a conventional change of sign of the in-plane voltages at the electrodes in subsequent frames, but additionally by switching the entry polarisation of the phase-modulating SLM or phase deflector between the two frames with the help of a polarisation-switching element. This is illustrated in FIG. 10 and explained in more detail in the accompanying description of the drawing.

A display for the presentation of two-dimensional and/or three-dimensional image contents can be provided according to this invention to comprise an illumination device with at least one light source and a phase modulator according to the claims. The phase modulator is disposed downstream of the illumination device in the direction of light propagation. The display according to this invention is particularly preferably designed such that it can be used for the presentation of holographic three-dimensional image contents and that it works according to the principles described in document WO 2006/0669191 A1. The display could also be designed such that stereoscopic image contents and/or stereoscopic multi-view image contents can be presented. Such a display (3D display) is able to show three-dimensional image contents in a three-dimensional way for perception by the human eye. As regards possible embodiments of the phase modulator for the display according to this invention, it is referred to the description above to avoid repetition.

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings.

BRIEF DESCRIPTION OF THE DRAWINGS

FIGS. 7' and 8' are schematic three-dimensional views which show a detail of a pixel of the embodiments of FIGS. 7 and 8.

Identical or comparable parts are given like numerals in all Figures.

DETAILED DESCRIPTION OF THE INVENTION

FIG. 2 illustrates the principle of a HAN cell according to the prior art which is based on the flexo-electric effect. In the HAN cell, the LC molecules 6 which are situated near one surface 7 are aligned parallel to the surface 7, and those which are situated near the other surface 8 are aligned perpendicular to the surface 8. If the liquid crystal molecules 6 have a suitable shape, then this molecule orientation will cause flexo-electric polarisation. The direction of rotation of the optical axis of a liquid crystal molecule 6 will then depend on the sign of the applied voltage V.

Figure 1:
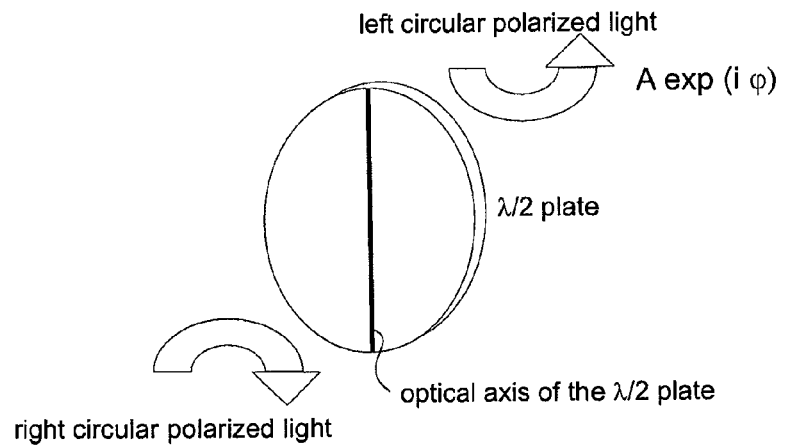
FIG. 1 illustrates the principle of phase modulation with circular polarised light and of the rotation of the optical axis of a λ/2 plate.
Figure 1:
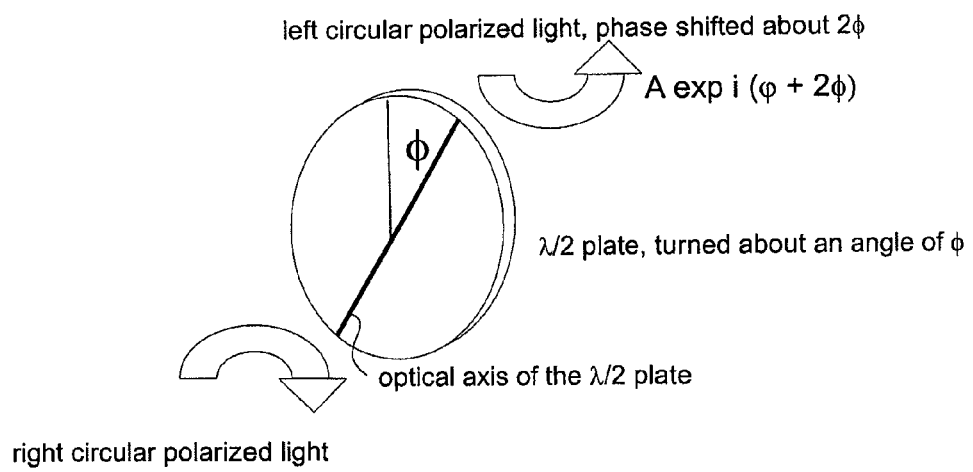
Figure 2A:
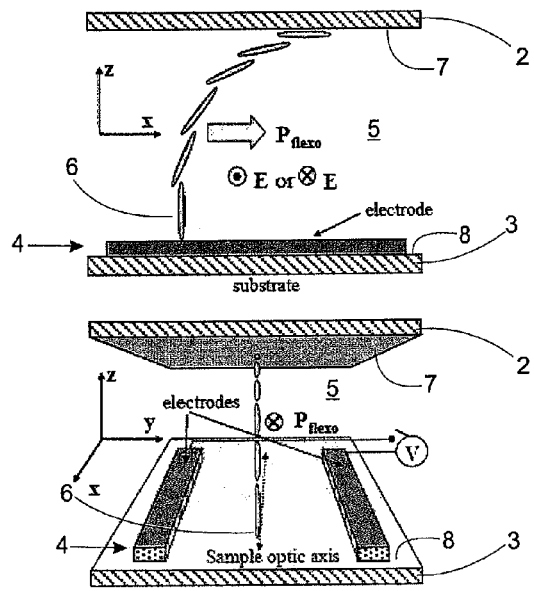
FIG. 2 shows the principle of a HAN cell according to the prior art which is based on the flexo-electric effect.
Figure 2B:
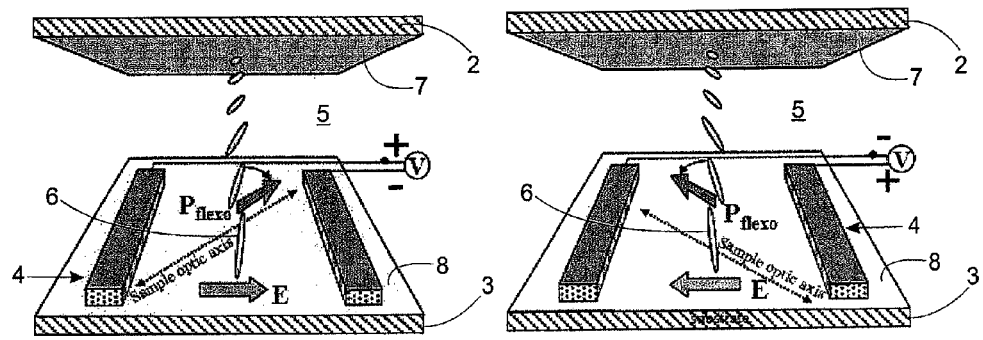
Figure 2C:
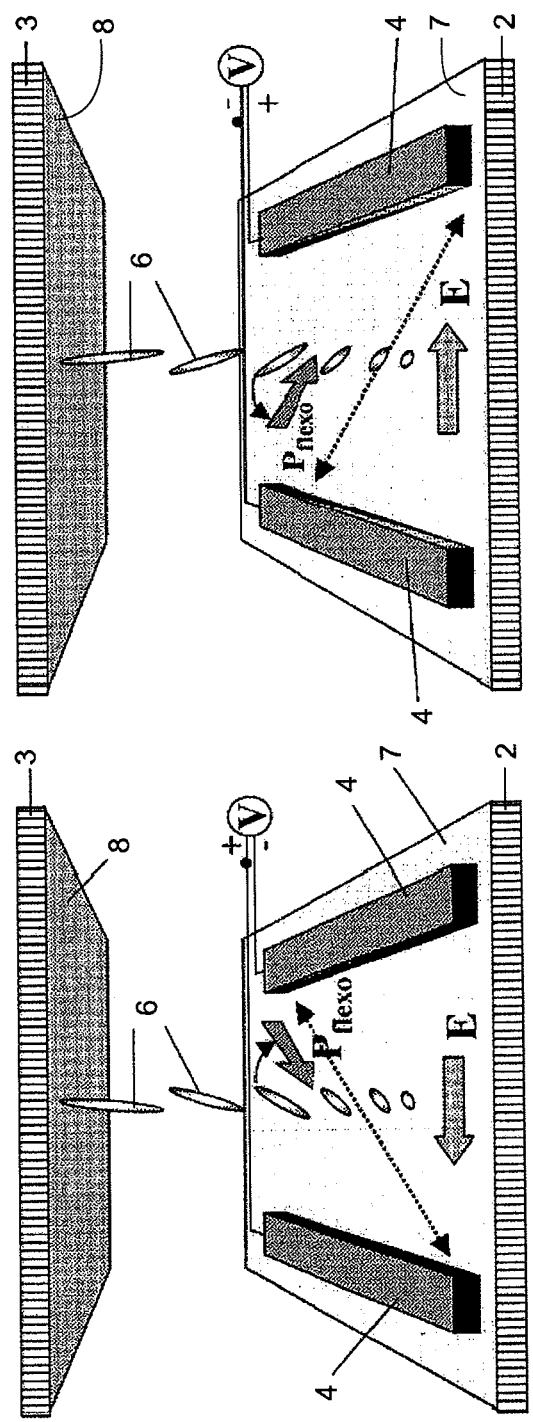

FIG. 2a shows a sectional view (top) and a perspective side view (bottom) which illustrate a detail of a HAN cell where the electrode arrangement 4 is not activated. FIG. 2b shows the same HAN cell of FIG. 2a again. A first active operational situation is shown on the left, where $P_{flexo}$ and the optical axis of the liquid crystal layer 5 are turned clockwise. A second active operational situation is shown on the right of FIG. 2b, where $P_{flexo}$ and the optical axis of the liquid crystal layer 5 are turned counter-clockwise. FIG. 2c shows a HAN cell which is known in the prior art, where a first operational situation is illustrated on the left and a second operational situation is illustrated on the right. In this HAN cell, the electrode arrangement 4 is disposed on the first substrate 2, and the first surface 7 is made such that the longitudinal axes of the liquid crystal molecules 6 which are situated next to the first surface 7 are substantially aligned parallel to the surface 7. Consequently, the in-plane electric field which is generated by the electrode arrangement 4 and which serves for aligning the liquid crystal molecules 6 immediately affects the part of the HAN cell at which the liquid crystal molecules 6 to be aligned are situated, namely the part which is adjacent to the first surface 7 of the first substrate 2, and thus the liquid crystal molecules 6 which are substantially aligned parallel to the first surface 7.

Figure 3:
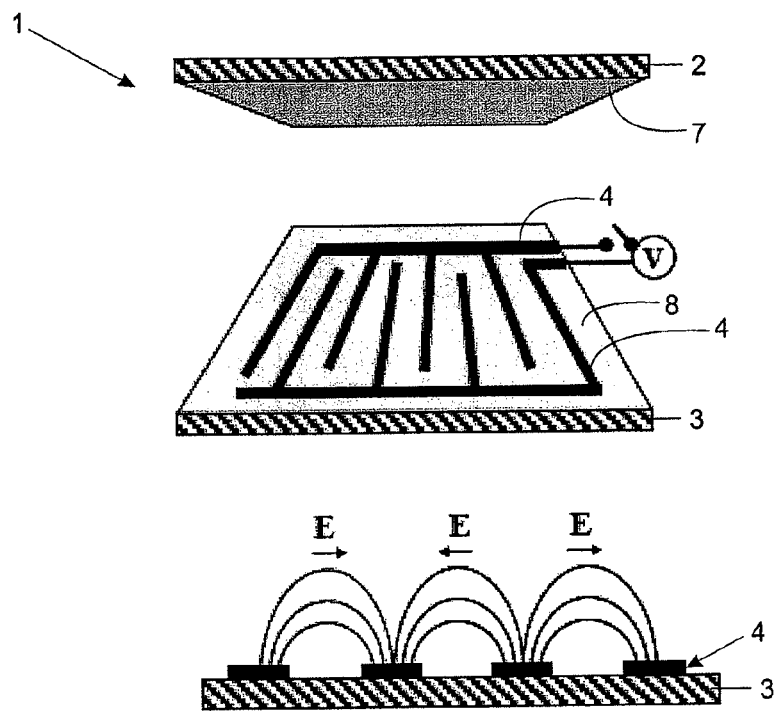
FIG. 3 shows a HAN cell with IPS-style electrode arrangement according to the prior art.

FIG. 3 shows a HAN cell with IPS-style electrode arrangement according to the prior art. Negative and positive voltages alternate across the electrode arrangement. Consequently, the direction of rotation of the optical axis also alternates. Since only the absolute value of the rotation angle is relevant for amplitude modulation, an amplitude-modulating pixel can be operated with such an arrangement. In contrast, phase modulation depends on the sign of the voltage. An electrode arrangement as shown in FIG. 3 is thus not suitable for a phase-modulating pixel.

Figure 4:
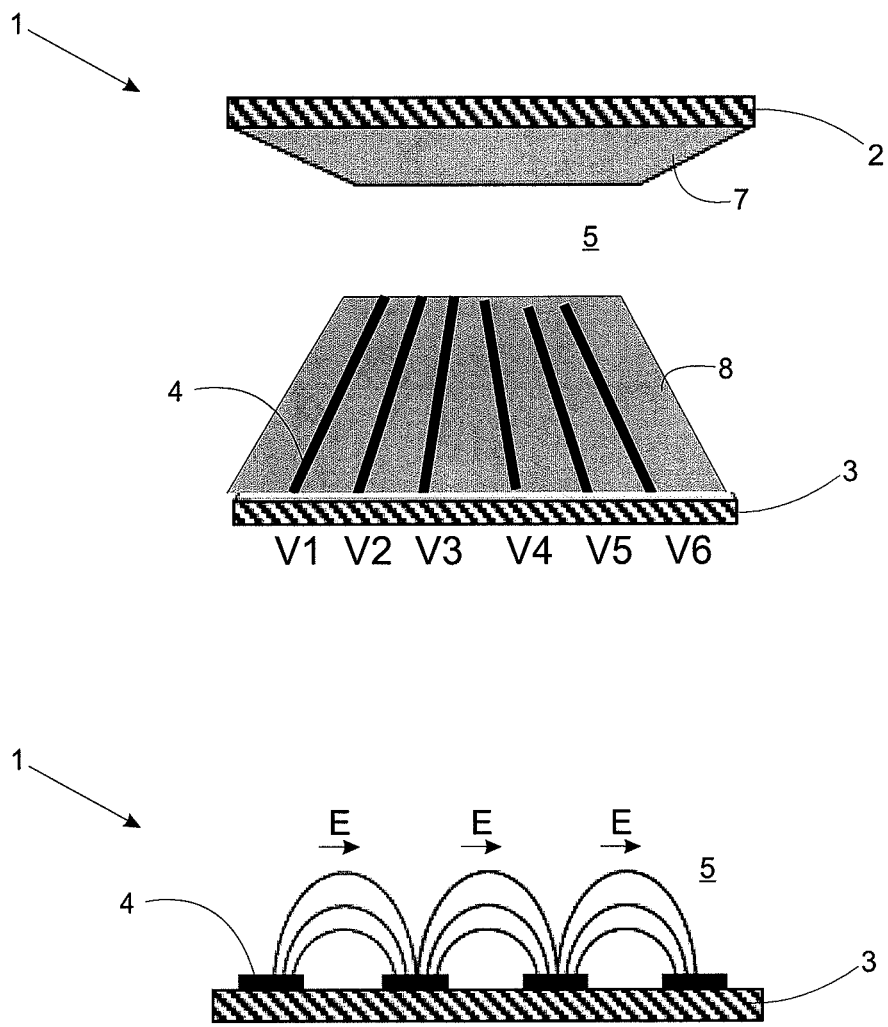
FIG. 4 shows a first embodiment of a phase modulator according to this invention.

The upper part of FIG. 4 is a perspective view which shows a detail of a phase modulator 1 according to this invention. The phase modulator 1 comprises a first substrate 2, a second substrate 3 and an electrode arrangement 4. A layer of liquid crystal molecules (not shown in FIG. 4) is disposed between the first substrate 2 and the second substrate 3. The lower part of FIG. 4 is a sectional view which shows schematically a second substrate 3 with the electrode arrangement 4. The first substrate is omitted here. The drawing further shows the field lines which will occur if the electrode arrangement 4 is activated. The electrode arrangement 4 is of a striped design. The electrode arrangement 4 is preferably controlled such that different voltages are applied to the individual electrodes of the electrode arrangement 4. These different voltages are designated V1 to V6 in FIG. 4. In a phase-modulating pixel of a phase modulator 1 according to this invention, a constant voltage gradient must be applied across the pixel. In other words, V6−V5=V5−V4= . . . =V2−V1=ΔV. In a phase deflector, the stripe electrodes are controlled individually.

Figure 5:
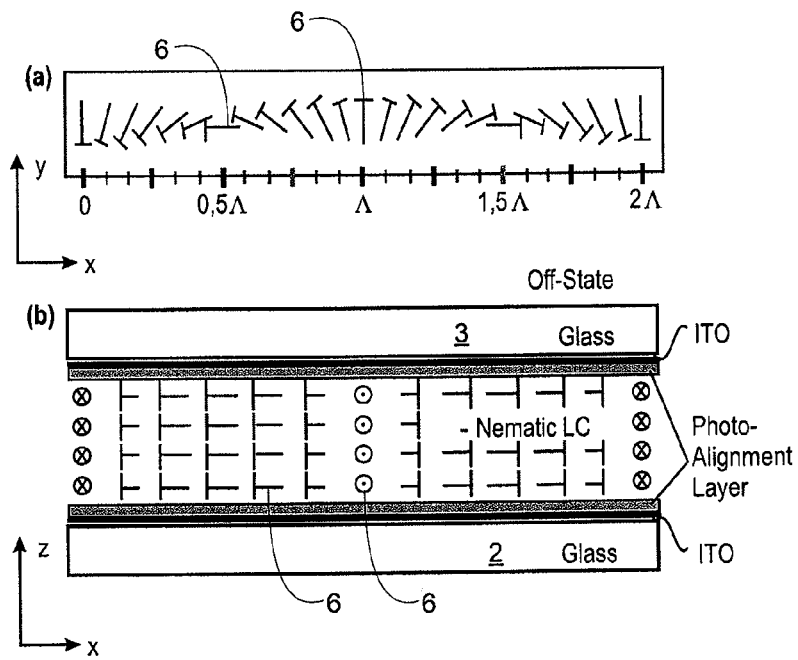
FIG. 5 shows an LC-based polarisation gating according to the prior art.

FIG. 5 shows an LC-based polarisation grating according to the prior art. The LC molecules 6 are aligned in-plane and rotate by 180 degrees in the plane over one grating period. FIG. 5 (a) is a front view which shows a detail of the polarisation grating, i.e. seen in the direction in which an observer looks at a display with such polarisation grating that is disposed parallel to the display surface. FIG. 5 (b) is a sectional view that shows a detail of the polarisation grating of FIG. 5 (a). Λ is the grating period of the polarisation grating.

Figure 6A:
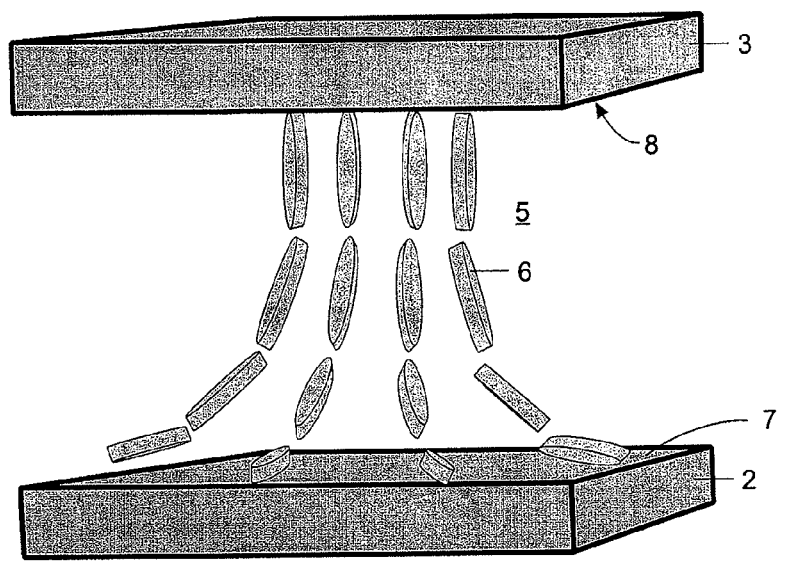
FIGS. 6A to 6C are sectional views each of which illustrating a detail of a further embodiment of a phase modulator according to this invention.

FIG. 6A is a schematic perspective three-dimensional view that illustrates a further embodiment of the present invention, namely a detail of a phase modulator 1 according to this invention which provides a polarisation grating which is based on the HAN mode. The simple drawing only shows the first substrate 2, the second substrate 3—with the respective surfaces 7, 8—and the liquid crystal layer 5 with the liquid crystal molecules 6. Although the liquid crystal molecules 6 in FIG. 6A are shown in the form of symmetrical ellipsoids, the liquid crystal molecules 6 in fact have a banana shape or pear shape which causes the flexo-electric effect. Anyway, the liquid crystal molecules 6 which are situated next to the surface 7 of the first substrate are aligned substantially parallel to the surface 7 because the surface 7 is designed accordingly. Further, the liquid crystal molecules 6 which are situated next to the surface 8 of the second substrate 3 are aligned substantially perpendicular to the surface 8 because the surface 8 is designed accordingly. The electrode arrangement is not shown in FIG. 6A.

Figure 6B:
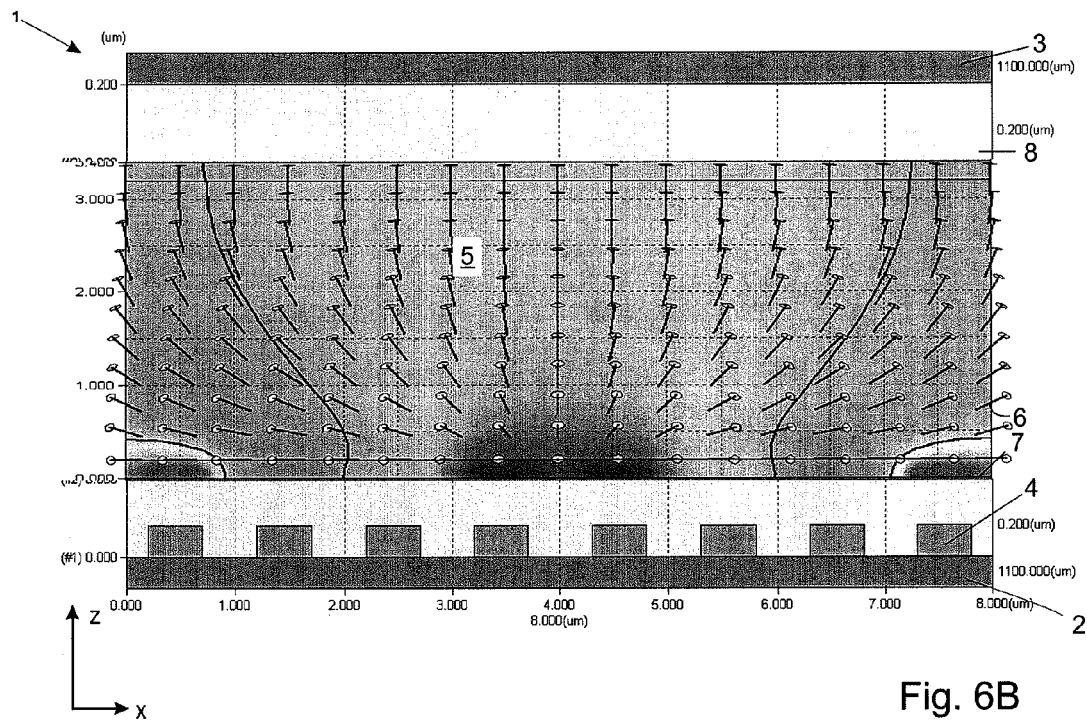

FIG. 6B is a sectional view which illustrates a detail of a further embodiment of a phase modulator 1 according to this invention. In this embodiment of the phase modulator according to this invention, the first surface 7 of the first substrate 2 is made in the form of a layer. The surface 7, which is adjacent to the liquid crystal layer 5 with the liquid crystal molecules 6, is made such that the liquid crystal molecules 6 which are situated next to the surface 7 are aligned substantially parallel to the surface 7. The electrode arrangement 4 with substantially stripe-shaped electrodes is disposed on the substrate 2 and embedded by the surface 7 layer material. The second substrate 3 has a surface 8 in the form of a layer which is made such that the liquid crystal molecules 6 which are situated next to it are aligned substantially perpendicular to the surface 8. The phase modulator 1 of FIG. 6B has an activated electrode arrangement 4 which is controlled such that a polarisation filter with a grating period of 16 μm is formed, of which only one half is shown here. The different greyscale values of the liquid crystal layer 5 illustrate the actual electric field strength. Further, equipotential lines of the actual electric field strength are shown.

Figure 6C:
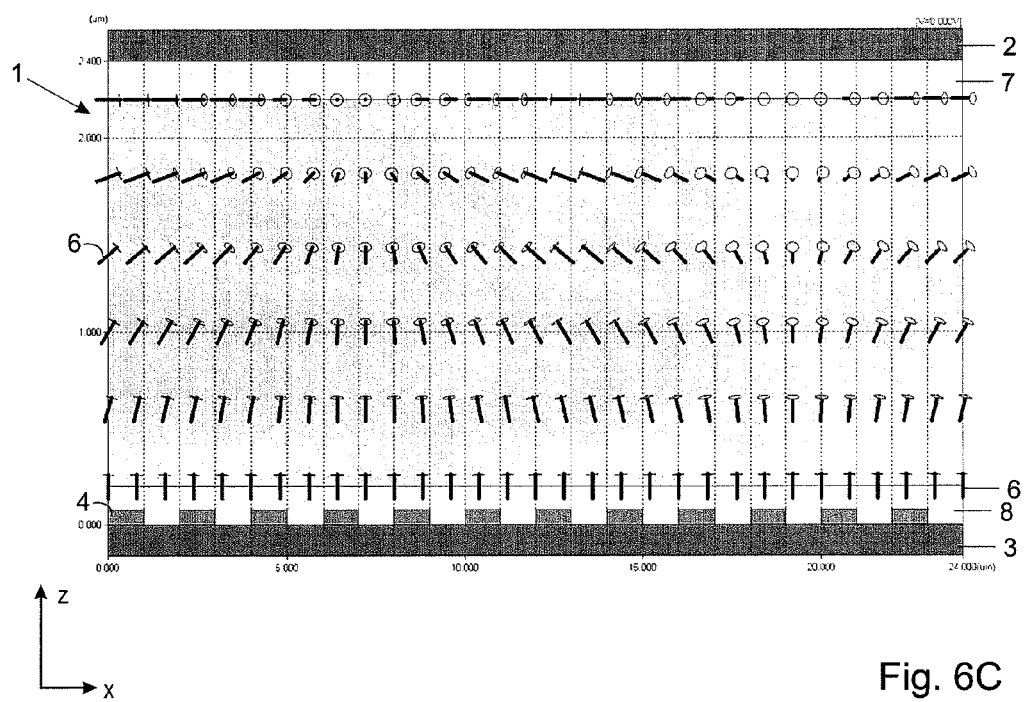

FIG. 6C is a sectional view that illustrates a further embodiment of a detail of a phase modulator 1 which provides a polarisation grating which is based on the HAN mode. According to the HAN configuration, the LC molecules 6 are aligned in-plane, i.e. parallel, to one surface layer or surface 7 but out-of-plane, i.e. substantially perpendicular, to the other surface layer or surface 8. It is the projection of the liquid crystal molecule 6 into the plane or first surface 7 that is rotated by 180 degrees in the polarisation grating over a grating period, while the angle of the liquid crystal molecule 6 by which they are turned out of the plane remains about constant. The borderline cases are a mere in-plane rotation near the upper substrate 2, and a mere rotation of the liquid crystal molecules 6 around their own axis near the lower substrate 3, because they are aligned perpendicular to the surface 7 there.

Figure 7:
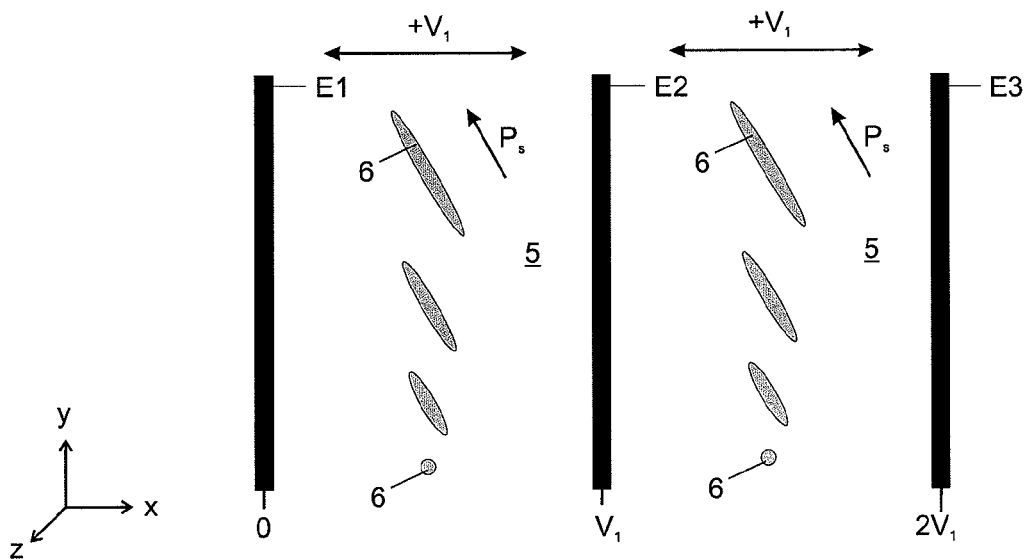
FIGS. 7 and 8 are schematic diagrams which show a front view (top) and sectional side view (bottom) illustrating a detail of a further embodiment of a phase modulator according to this invention.
Figure 7:
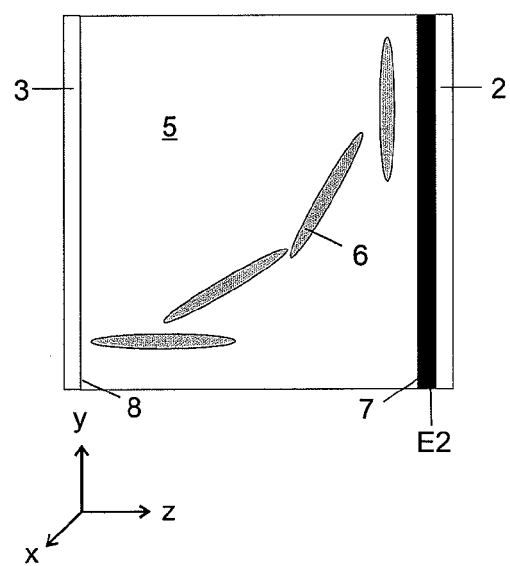

FIG. 7 is a schematic view which shows a detail of a pixel of a light modulator according to this invention, where the pixel is a part of the light modulator of a display and where it is looked at in a direction in which an observer would watch the light modulator or display. To make things clearer, the same cell or pixel is turned by 90 degrees below (the lower substrate 2 with the electrode E2 is on the right-hand side). In the upper view, the liquid crystal molecule 6 at the bottom is situated next to the substrate which is closer to the observer, and it points out of the drawing plane. The liquid crystal molecule 6 at the top is situated next to the substrate which is further away from the observer, and it lies in the drawing plane. To realise the same rotation angle in the drawing plane, a positive voltage V1 is required between the electrodes E1 and E2, and a positive voltage V1 is required again between the electrodes E2 and E3. This means that the voltage 2×V1 is applied to the electrode E3.

Figure 8:
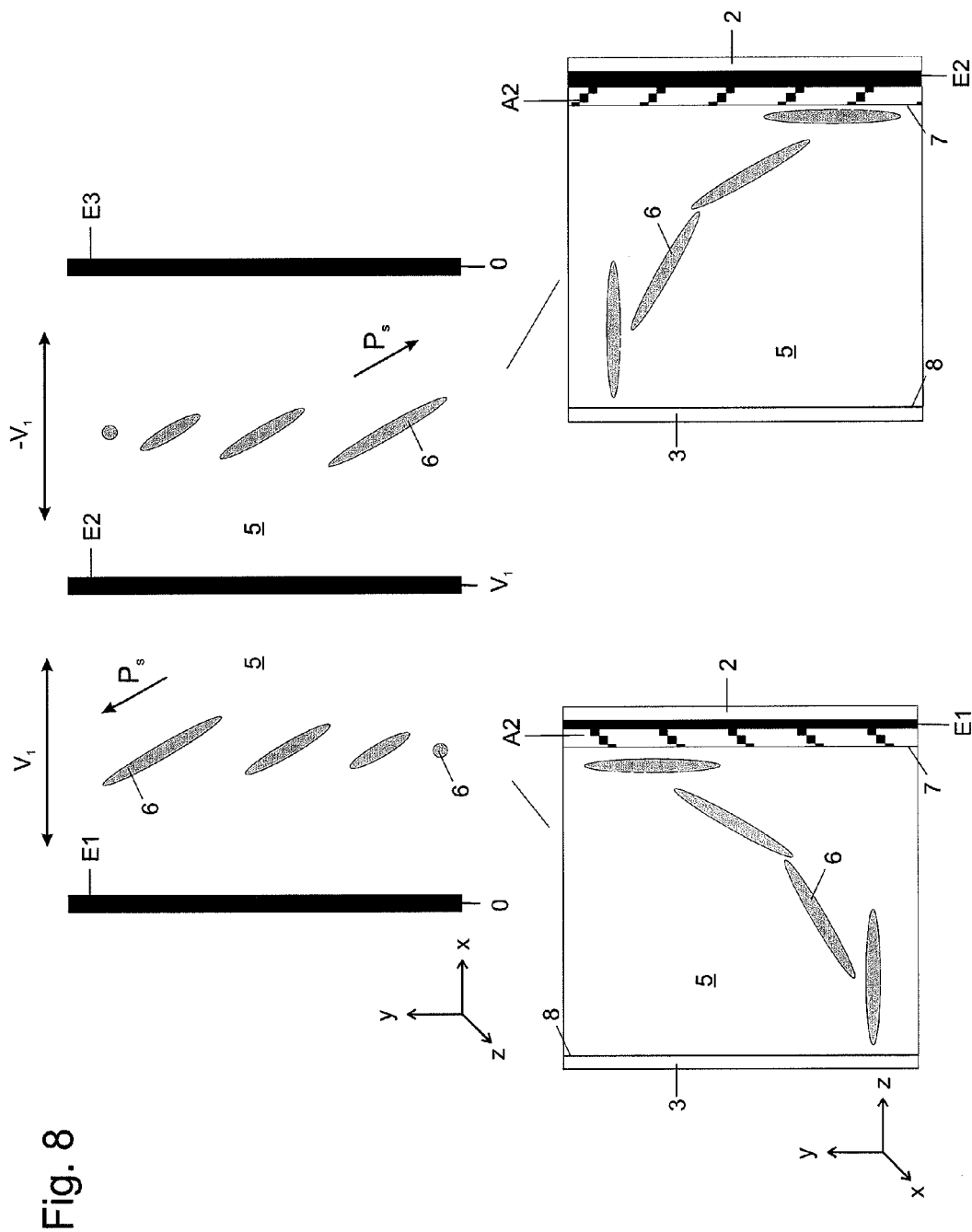
Figure 8:
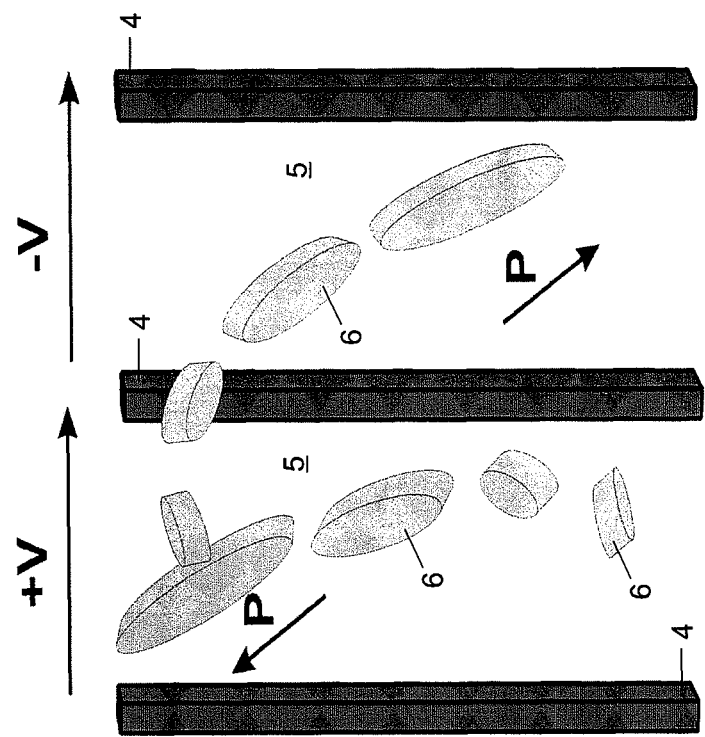
Figure 7:
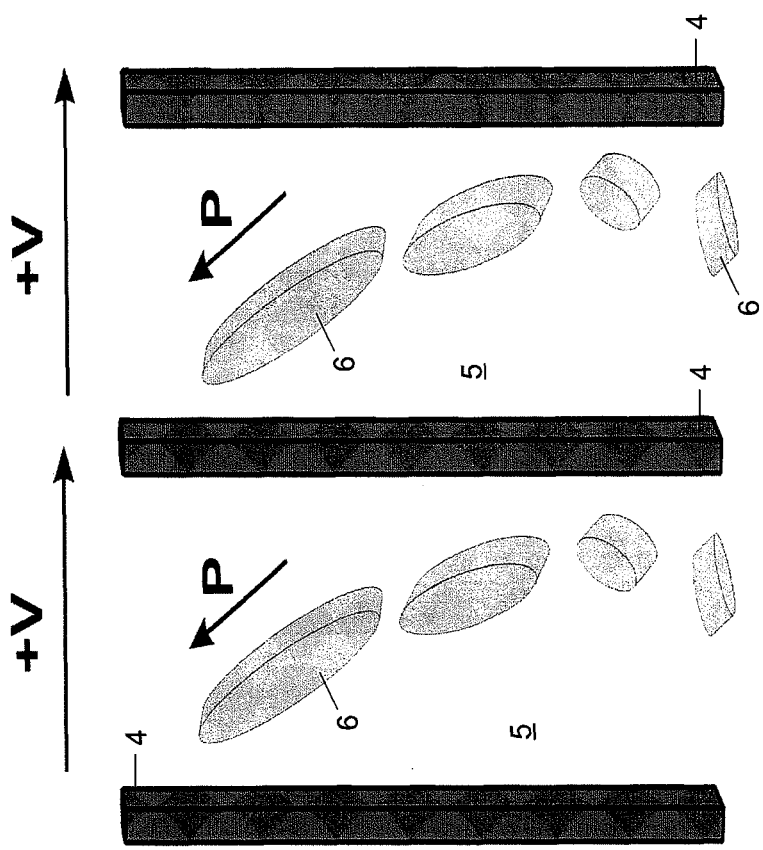

FIG. 8 is an arrangement with a structured alignment layer A1 and A2 on the side where the liquid crystal molecules 6 are substantially aligned parallel to the surface 7. The upper part of the drawing shows the same molecule alignment as described above between electrodes E1 and E2. However, between electrodes E2 and E3 the molecules are aligned the other way round, namely vertically on top and horizontally at the bottom. This means that an opposing direction of rotation will occur if the same voltage is applied. If a voltage of 0 V is applied to electrode E1, a voltage V1 is applied to electrode E2 and a voltage of 0 V is applied again to electrode E3, then the sign of the voltage between two electrodes alternates, but the direction of rotation remains the same. Further electrodes can continue to be supplied with the voltages V1 and 0 V alternately. This embodiment preferably only requires two comb-shaped electrodes, and it is not necessary to control individual electrodes of a pixel individually.

FIGS. 7' and 8' are three-dimensional views which show the same details of the light modulators shown in the upper parts of FIGS. 7 and 8, where the liquid crystal molecules 6 are drawn in a greatly magnified manner and with an idealised three-dimensional shape.

Figure 9:
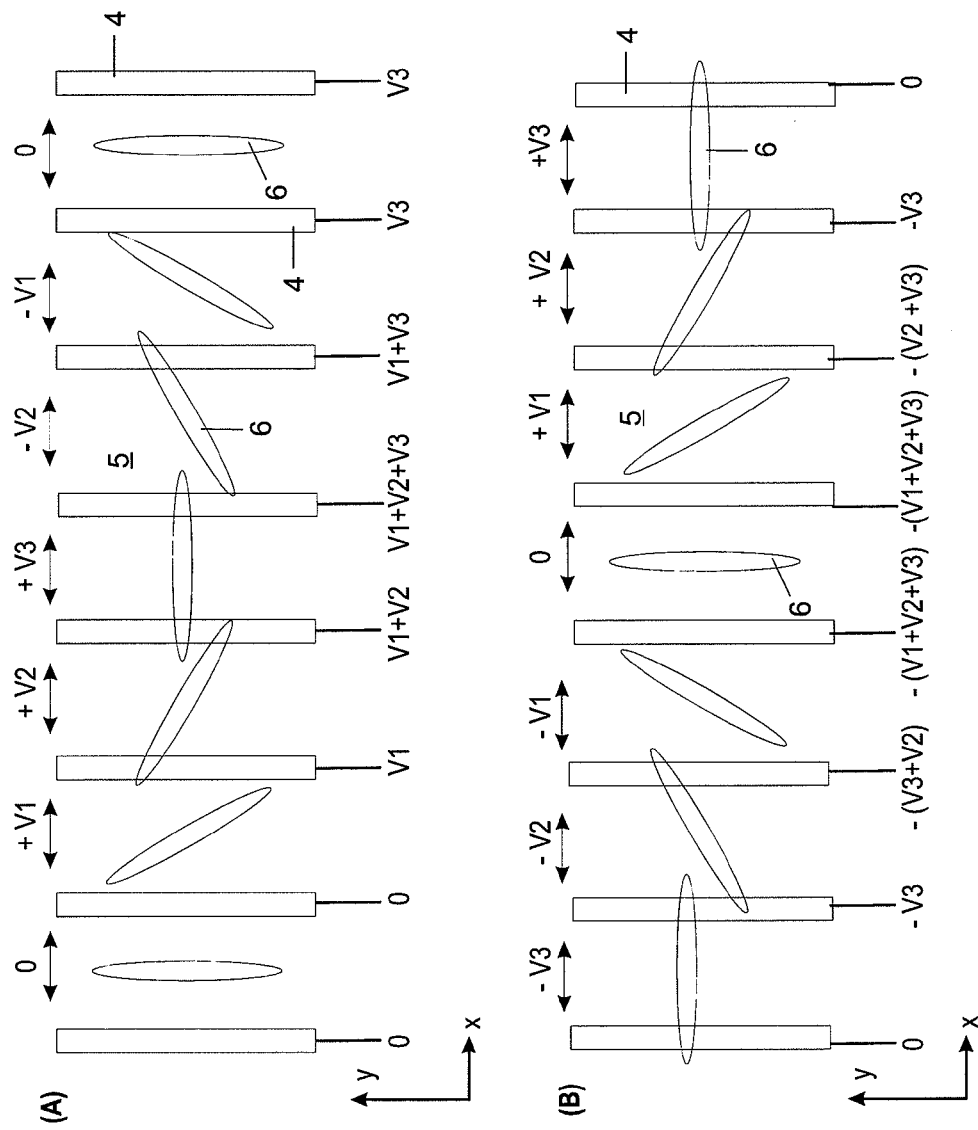
FIGS. 9 and 10 are schematic diagrams each of which showing a front view illustrating a detail of a further embodiment of a phase modulator according to this invention in two different operational situations (views A and B).

FIG. 9 schematically shows front views, each of which illustrating a detail of a further embodiment of a phase modulator according to this invention. The diagrams illustrate the use of a phase offset that is introduced between subsequent frames, in particular in a HAN phase deflector. The orientation of the liquid crystal molecules 6 which are situated near the substrate where the liquid crystal molecules 6 have a plane orientation is shown schematically only. FIG. 9 (B) shows that the grating period of FIG. 9 (A) is maintained after a phase offset, but that the applied voltages are modified such that no DC voltage effects can occur. The drawing shows over the electrodes the relative voltages which are applied between two neighbouring electrodes and below the electrodes the absolute voltages which are applied to the individual electrodes. The relative voltage changes between positive and negative for most electrodes, and for some it also changes between zero and positive or negative. In this example, the phase offset between the two frames is $\pi$, which corresponds to a change in the in-plane rotation angle of the liquid crystal molecules 6 of 90 degrees. Generally, more than two frames can be given different phase offsets in order to reduce the resultant temporal average voltages further, for example following a sequence of 0, $\pi/2$, $\pi$, $3\pi 2$. Accordingly, the phase values which are written to the phase modulator for a certain frame differ from the phase values which are written to the phase modulator for the subsequent frame by a phase offset such that the voltage difference between neighbouring in-plane electrodes varies.

Figure 10:
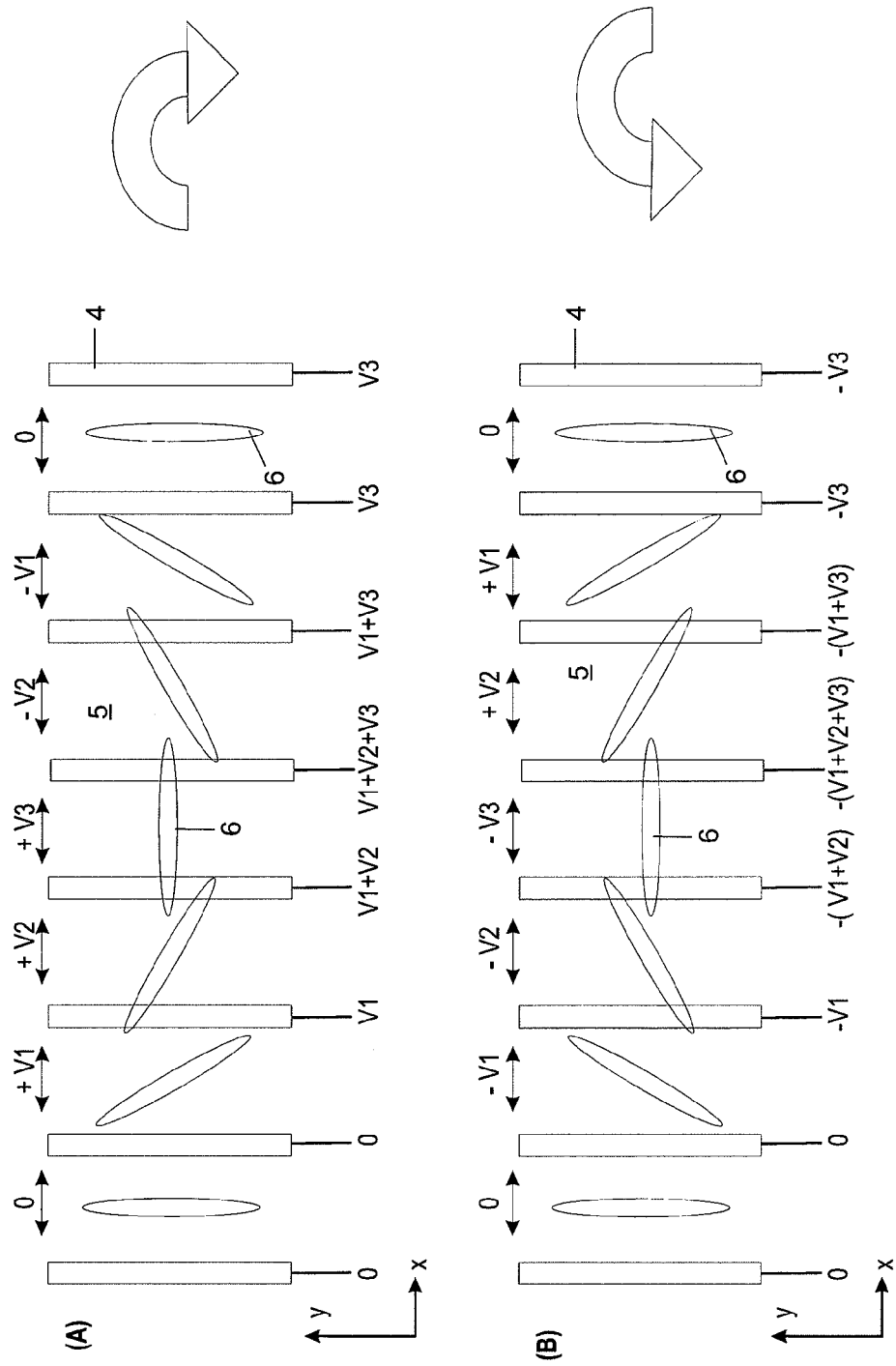

FIGS. 10 (A) and 10 (B) are schematic front views, each of which illustrating a detail of a further embodiment of a phase modulator according to this invention. They show schematically the orientation of the liquid crystal molecules 6 which are situated near the substrate with planar orientation of a phase deflector. The signs of all applied voltages were changed between the diagrams in FIGS. 10 (A) and 10 (B). This results in a distribution of orientations of the liquid crystals from which a refractive index distribution of the light which interacts with the phase modulator is derived. This refractive index distribution has the effect of a polarisation grating with same grating period but opposing direction of rotation of the circular polarised light. For light of the same entry polarisation, this polarisation grating would correspond with a phase profile with different sign and deflect light in a different direction. However, if the polarisation of the incident light is changed too between the two operational situations shown in FIGS. 10 (A) and 10 (B), e.g. from counter-clockwise circular to clockwise circular (indicated by arrows), then the orientation of the liquid crystal molecules 6 in FIG. 10 (B) results in the same phase profile for the changed polarisation than the orientation of the liquid crystal molecules 6 in FIG. 10 (A) for the initial polarisation. It is an advantageous aspect of this embodiment that the temporal average of the applied voltages becomes zero already after two frames. The embodiments shown are all phase deflectors.

However, the concepts explained can be applied likewise in particular to transmissive and reflective light modulators. The polarisation-switching element can for example be realised in the form of an on/off-switchable $\lambda/2$ plate on LC basis with plane (non-pixelated) electrodes. In other words, the voltages which are applied to the electrodes of the electrode arrangement of the phase modulator according to this invention during two subsequent frames are subject to a change of sign. During one of multiple frames, the light which interacts with the phase modulator is brought to a first polarisation state with a polarisation-switching element. During the subsequent frame, the light which interacts with the phase modulator is brought to a second polarisation state.

CITATIONS

[1] Eurodisplay 2009 Proceedings, Presentations 4-6
[2] Imid 2009 Digest, Presentations 1-3, pp. 14-16

Finally, it is noticed that the embodiments described above shall solely be understood to illustrate the claimed teaching, but that the claimed teaching is not limited to these embodiments.

The invention claimed is:

1. A phase modulator for the modulation of the phase of circular polarised light which interacts with the phase modulator, comprising
    a first and a second substrate, an electrode arrangement and a liquid crystal layer with liquid crystal molecules,
        where the electrode arrangement comprises parallel arranged and independently controllable individual electrodes on one of the substrates only,
        where the first substrate is disposed adjacent to the second substrate, where the liquid crystal layer is disposed between the first and second substrates,
        where the first substrate has a first surface, and the second substrate has a second surface,
        where the first surface is made such to align the liquid crystal molecules which are situated next to the first surface in an orientation which is substantially parallel to the first surface,
        where the second surface is made such to align the liquid crystal molecules which are situated next to the second surface in an orientation which is substantially perpendicular to the second surface,
    where the electrode arrangement is controlled such that an in-plane component of the liquid crystal molecule orientation has a settable angular range of about 180 degrees or between −90 degrees and +90 degrees related to a specifiable central orientation between each of neighboring individual electrodes independently.

2. The phase modulator according to claim 1 which is designed such that the light which interacts with the phase modulator is variably deflected in a specifiable direction due to diffraction and that the function of a deflection grating is thus achieved.

3. The phase modulator according to claim 2 where the electrode arrangement is controlled such that depending on the position of the phase modulator at which a light beam hits the phase modulator the light is deflected in a variably specifiable direction.

4. The phase modulator according to claim 1 where the phase modulator comprises individual pixels and where each pixel of the phase modulator comprises at least two electrodes of the electrode arrangement.

5. The phase modulator according to claim 4 where the electrode arrangement is controlled such that a substantially constant voltage difference is applied between two neighbouring electrodes.

6. The phase modulator according to claim 1, wherein said phase modulator is operable either in transmissive or reflective light modulators.

7. The phase modulator according to claim 1 where a surface of one of said first and second substrates has a structured surface coating with a first structure between first neighboring electrodes and a second structure between second neighboring electrodes which are arranged next to each other, the first and second structures designed such that the liquid crystal molecules which are in contact with the first structure are aligned substantially anti-parallel to the liquid crystal molecules which are in contact with the second structure.

8. The phase modulator according to claim 1 where phase values which are written to the phase modulator for a first frame differ from the phase values which are written to the phase modulator for a second frame by a phase offset which corresponds to the voltage difference between neighbouring individual electrodes of the first frame of a constant distance from the neighboring individual electrodes of the second frame.

9. The phase modulator according to claim 1 where the voltages which are applied to the electrodes during subsequent frames comprise a change of sign and where the light which interacts with the phase modulator is brought to a first polarisation state by a polarisation-switching element during one of successive frames and where the light which interacts with the phase modulator is brought to a second polarisation state during the subsequent frame.

10. A display for the presentation of two-dimensional and/or three-dimensional image contents with an illumination device comprising at least one light source and with a phase modulator according to one of claims 1 to 9, where the phase modulator is disposed downstream of the illumination device in the direction of light propagation.

\* \* \* \* \*